(12) United States Patent
Wu et al.

(10) Patent No.: US 8,205,069 B2
(45) Date of Patent: Jun. 19, 2012

(54) COMPUTER SYSTEM WITH DUAL BIOS

(75) Inventors: Chao-Chung Wu, Taipei (TW); Yu-Chen Lee, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 422 days.

(21) Appl. No.: 12/402,485

(22) Filed: Mar. 11, 2009

(65) Prior Publication Data
US 2009/0259837 A1    Oct. 15, 2009

(30) Foreign Application Priority Data

Apr. 14, 2008 (TW) ................................ 97113491 A

(51) Int. Cl.
*G06F 9/00* (2006.01)
*G06F 15/177* (2006.01)

(52) U.S. Cl. ............................................... 713/2
(58) Field of Classification Search ........................ 713/2
See application file for complete search history.

(56) References Cited

U.S. PATENT DOCUMENTS

| 7,451,304 B2 * | 11/2008 | Chang et al. ........................ 713/2 |
| 2003/0076311 A1 * | 4/2003 | Lin et al. ........................ 345/204 |
| 2007/0033390 A1 | 2/2007 | Chang et al. |
| 2009/0063834 A1 * | 3/2009 | Huang et al. ........................ 713/2 |
| 2009/0158025 A1 * | 6/2009 | Hung et al. ........................ 713/2 |

FOREIGN PATENT DOCUMENTS

| CN | 1412666 | 4/2003 |
| CN | 101017441 A | 8/2007 |
| TW | 591377 | * 4/2004 |
| TW | 591377 | 6/2004 |
| TW | 200743116 | 11/2007 |

OTHER PUBLICATIONS

"1st Office Action of China Counterpart Application", issued on Mar. 29, 2010, p. 1-p. 6.
Zheng Fenling, "How to Arrange the Program Including If Sentence in the C Language" with English Abstract, Journal Information: Mechanical Management and Development Year 2007, Issue 3, p. 99-100,102.
"Office Action of Taiwan Counterpart Application", issued on Jul. 13, 2011, p. 1-p. 7.
"First Office Action of China Counterpart Application", issued on Jul. 25, 2011, p. 1-p. 3.

* cited by examiner

*Primary Examiner* — Mohammed Rehman
(74) *Attorney, Agent, or Firm* — Jianq Chyun IP Office

(57) ABSTRACT

A computer system including a first memory unit, a second memory unit and a switch unit is provided. The first memory unit stores a first BIOS. The second memory unit stores a second BIOS. The switch unit has a first configuration and a second configuration. Upon the computer system being started, the switch unit receives an enable signal. When the switch unit is in the first configuration, the enable signal is provided to the first memory unit to start the first basic input/output system. When the switch unit is in the second configuration, the enable signal is provided to the second memory unit to start the second basic input/output system.

6 Claims, 4 Drawing Sheets

COMPUTER SYSTEM WITH DUAL BIOS

CROSS-REFERENCE TO RELATED APPLICATION

This application claims the priority benefit of Taiwan application serial no. 97113491, filed on Apr. 14, 2008. The entirety of the above-mentioned patent application is hereby incorporated by reference herein and made a part of this specification.

BACKGROUND OF THE INVENTION

1. Field of the Invention

The present invention generally relates to a computer system, and more particularly, to a computer system with dual basic input/output systems (hereinafter briefly referred to as "BIOS").

2. Description of Related Art

In existing motherboards with dual-BIOS, the two BIOSes are independent systems, each of which can be used to boot the computer system. The computer system determines to use which BIOS to boot the computer system according to a setting of the BIOS. In one practical implementation, upon the computer system being started, data of the BIOS used to boot the computer system is first loaded to a random access memory (RAM) and the BIOS is then used to boot the computer system. The computer system turns to use the other BIOS to boot the system only when the BIOS loaded to the RAM fails to boot the system.

In addition, in existing motherboards with dual-BIOS, data can be written from one BIOS to the other. In other words, data of one BIOS can be backed up to the other BIOS. In one practical implementation, upon the computer system being started, the computer system enters a setting interface and the BIOS backup is performed by BIOS firmware in response to a BIOS backup instruction inputted by a user.

It can be seen from the foregoing discussion that, when the preset BIOS is damaged which causes the system boot to fail, the user can select the other BIOS to boot the system and, after the system has been booted, the BIOS backup can be performed to repair the damaged BIOS. However, in the conventional implementations, the computer system turns to use the other BIOS to boot the system only when the system boot fails, which makes it impossible for the user to select a desired BIOS to boot the computer system prior to the start of the computer system. In addition, in the conventional implementations, the computer system is able to backup the BIOS only after the system has been booted.

SUMMARY OF THE INVENTION

The present invention provides a computer system including a first memory unit, a second memory unit, and a switch unit. The first memory unit stores a first basic input/output system (BIOS). The second memory unit stores a second BIOS. The switch unit has a first configuration and a second configuration. Upon the computer system being started, the switch unit receives an enable signal. When the switch unit is in the first configuration, the enable signal is provided to the first memory unit to start the first basic input/output system. When the switch unit is in the second configuration, the enable signal is provided to the second memory unit to start the second basic input/output system.

The present invention provides a computer system including a first memory unit, a second memory unit, a register, and a microcontroller. The first memory unit stores a first BIOS. The second memory unit stores a second BIOS. The register records a setting. The microcontroller controls an enable signal to be outputted to the first or second memory unit according to the setting in the register when the computer system is started.

The present invention provides a computer system including a first memory unit, a second memory unit, a switch, and a microcontroller. The first memory unit stores a first BIOS. The microcontroller is coupled to the first memory unit, the second memory unit and the switch. The microcontroller reads the first BIOS in the first memory unit and stores the first BIOS in the second memory unit when the microcontroller detects that the switch is closed.

The present invention includes a switch unit such that the internal configuration of the switch unit can be changed prior to starting of the computer system. After the computer system starts, the computer system determines the BIOS used to boot the computer system according to the internal configuration of the switch unit. In addition, the present invention includes a microcontroller that enables the computer to backup the BIOS prior to the starting of the computer.

In order to make the aforementioned and other features and advantages of the present invention more comprehensible, embodiments accompanied with figures are described in detail below.

DESCRIPTION OF THE EMBODIMENTS

The present invention will now be described more fully hereinafter with reference to the accompanying drawings, in which four embodiments of the invention are shown. As will be described, embodiments of the present invention allow for user selection of a desired BIOS to boot a computer system as well as backup of BIOS prior to system boot.

First Embodiment

Figure 1:
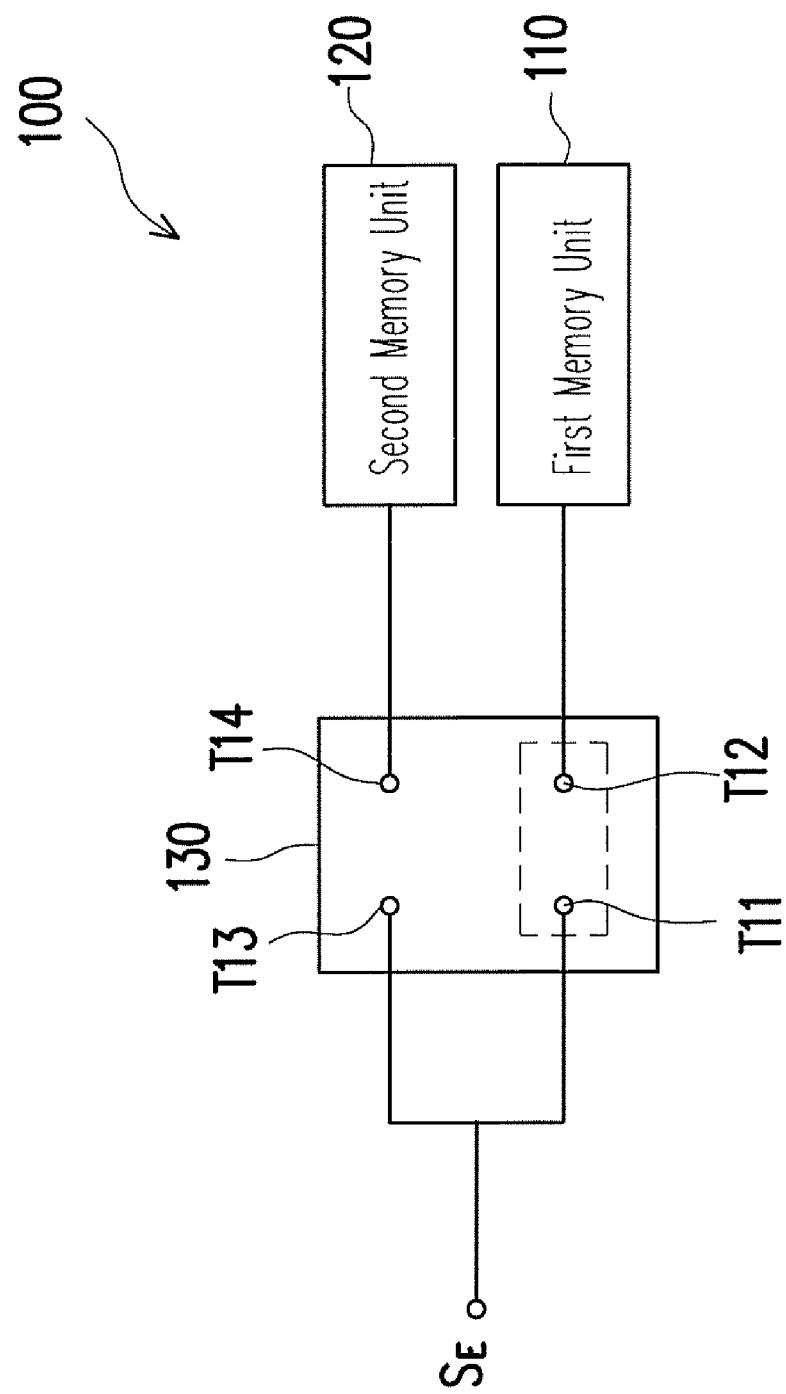
FIG. 1 illustrates a block diagram of a computer system according to a first embodiment of the present invention.

FIG. 1 illustrates a block diagram of a computer system according to a first embodiment of the present invention. Referring to FIG. 1, the computer system 100 includes a first memory unit 110, a second memory unit 120, and a switch unit 130. For ease of description of the present embodiment, it is assumed that the first memory unit 110 and the second memory unit 120 store a first BIOS and a second BIOS, respectively, and the switch unit 130 is a 4-terminal jumper.

As shown in FIG. 1, the switch unit 130 includes a first terminal T11, a second terminal T12, a third terminal T13, and a fourth terminal T14. The switch unit 130 has a first configuration and a second configuration. When the switch unit 130 is in the first configuration, the first terminal T11 is electrically conductive with the second terminal T12. When the switch unit 130 is in the second configuration, the third terminal T13 is electrically conductive with the fourth terminal T14.

Upon the computer system 100 being started, the computer system 100 outputs an enable signal $S_E$ to the switch unit 130.

The switch unit 130 determines to provide the enable signal $S_E$ to the first memory unit 110 or the second memory unit 120 according to the current internal configuration of the switch unit 130. For example, when the switch unit 130 is in the first configuration where the first terminal T11 is electrically conductive with the second terminal T12, the enable signal $S_E$ is provided to the first memory unit 110 such that the computer system 100 can be booted using the first BIOS. When the switch unit 130 is in the second configuration where the third terminal T 3 is electrically conductive with the fourth terminal T14, the enable signal $S_E$ is provided to the second memory unit 120 such that the computer system 100 can be booted using the second BIOS.

The memory chip storing the BIOS is controlled by a south bridge chip on a motherboard or an embedded controller and is connected through a 4-pin serial peripheral interface (SPI) based on current technology. Taking the SPI protocol as an example, the four pins are used to transmit a clock signal, a chip select signal, data output and input signals, respectively. The chip select signal is outputted from the controlling end (South bridge chip or embedded controller) to notify the controlled end (memory chip) to start operation. Therefore, when the present embodiment is carried out by the current computer technology, the computer system 100 can be connected to the south bride chip on the motherboard or an embedded controller, the chip select signal can be used as the enable signal $S_E$ of the present embodiment, and the switch unit 130 determines whether to provide the chip select signal to the first memory unit 110 or the second memory unit 120 so as to enable the first memory unit 110 or the second memory unit 120. The clock signal, data output and input signals can be directly outputted to the first memory unit 110 or the second memory unit 120.

In the present embodiment, the switch unit 130 determines which BIOS is used to boot the computer system 100 according to the internal configuration. In other words, prior to the start of the computer system 100, the user may use a conductive plate to electrically connect the first terminal T11 to the second terminal T12 of the switch unit 130, or electrically connect the third terminal T13 to the fourth terminal T14 of the switch unit 130, to thereby decide which BIOS is used to boot the system. In the present embodiment, the switch unit 130 is implemented as a jumper. It should be understood, however, that the switch unit may also be a press button or a slide switch.

Second Embodiment

Figure 2:
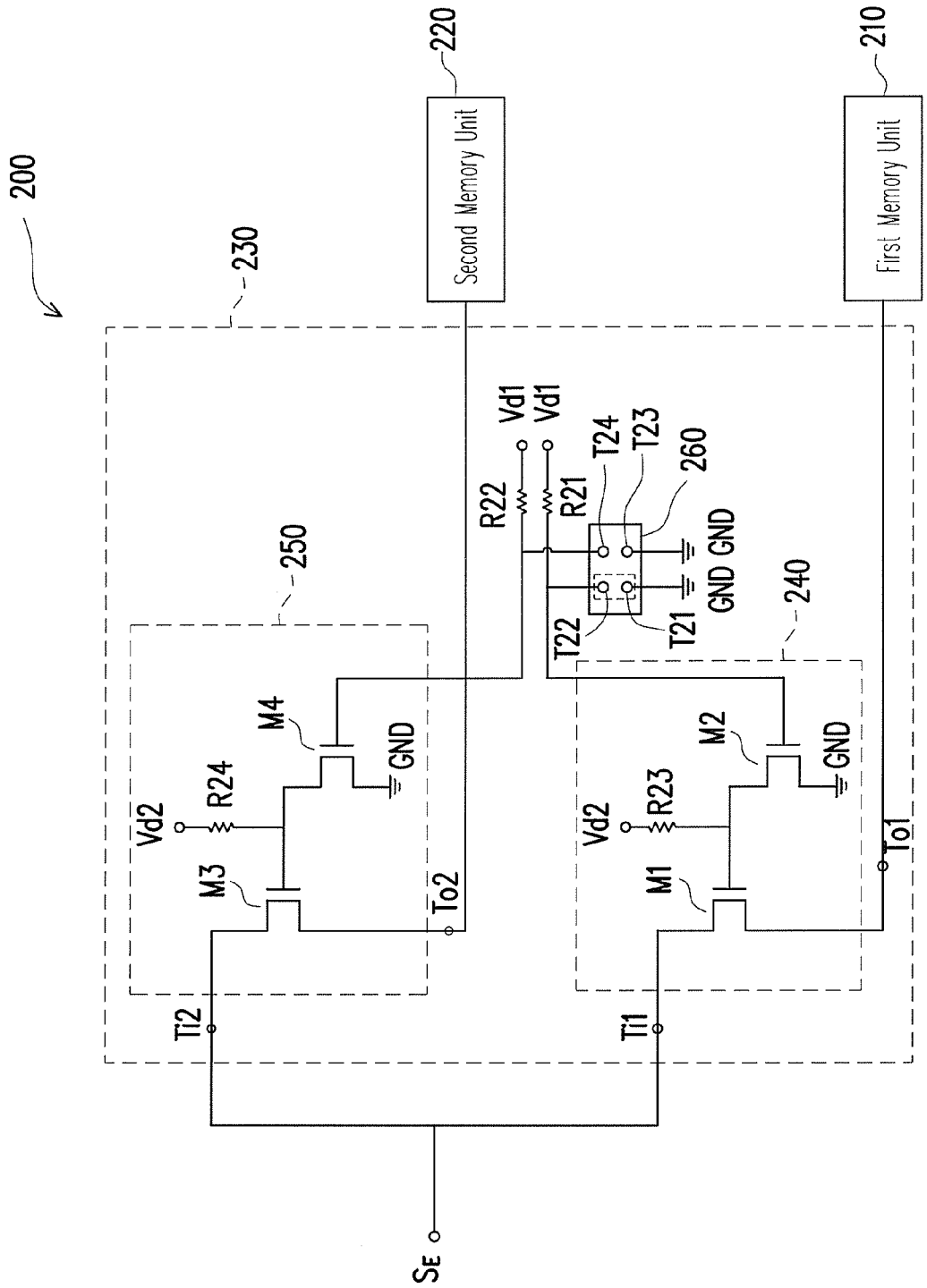
FIG. 2 illustrates a block diagram of a computer system according to a second embodiment of the present invention.

FIG. 2 illustrates a block diagram of a computer system according to a second embodiment of the present invention. Referring to FIG. 2, the computer system 200 includes a first memory unit 210, a second memory unit 220, and a switch unit 230. For ease of description of the present embodiment, it is assumed that the first memory unit 210 and the second memory unit 220 store a first BIOS and a second BIOS, respectively.

As shown in FIG. 2, the switch unit 230 includes a first switch circuit 240, a second switch circuit 250, and a selection element 260. The first switch circuit 240 has an input terminal Ti1 and an output terminal To1. The second switch circuit 250 has an input terminal Ti2 and an output terminal To2. The input terminal Ti1 of the first switch circuit 240 and the input terminal Ti2 of the second switch circuit 250 receive an enable signal $S_E$. The output terminal To1 of the first switch circuit 240 and the output terminal To2 of the second switch circuit 250 are coupled to the first memory unit 210 and the second memory unit 220, respectively.

The selection element 260 has a first terminal T21, a second terminal T22, a third terminal T23, and a fourth terminal T24. The first terminal T21 and the third terminal T23 are coupled to a ground voltage GND. The second terminal T22 is coupled to the first switch circuit 240 and a resistor R21. The fourth terminal T24 is coupled to the second switch circuit 250 and a resistor R22. One end of the resistor R21 is coupled to the second terminal T22 and the other end of the resistor R21 is coupled to a first reference voltage Vd1. One end of resistor R22 is coupled to the fourth terminal T24 and the other end of the resistor R22 is coupled to the first reference voltage Vd1.

The first switch circuit 240 includes a first transistor M1, a second transistor M2, and a resistor R23. A first source/drain of the first transistor M1 receives the enable signal $S_E$ and is used as the input terminal Ti1 of the first switch circuit 240. A second source/drain of the first transistor M1 is coupled to the first memory unit 210 and is used as the output terminal To1 of the first switch circuit 240. A gate of the first transistor M1 is coupled to the resistor R21 and the second transistor M2. A first source/drain of the second transistor M2 of the first switch circuit 240 is coupled to the resistor R23. A second source/drain of the second transistor M2 is coupled to the ground voltage GND. A gate of the second transistor M2 is coupled to the second terminal T22 of the selection element 260. One end of the resistor R23 is coupled to the gate of the first transistor M1 and the first source/drain of the second transistor M2, and the other end of the resistor R23 is coupled to a second reference voltage Vd2. In addition, the second switch circuit 250 includes a third transistor M3, a fourth transistor M4, and a resistor R24. In the present embodiment, the internal components of the second switch circuit 250 are constructed and arranged in a similar way as described in the first switch circuit 240 and therefore are not repeated herein.

In the present embodiment, when the first terminal T21 is coupled to the second terminal T22 of the selection unit 260 and the third terminal T23 is disconnected from the fourth terminal T24, the second terminal T22 of the selection unit 260 outputs a first selection signal (i.e., the ground voltage GND) to the switch circuit 240. At this time, the gate of the second transistor M2 receives the ground voltage GND causing the second transistor M2 to turn off and the first transistor M2 to turn on, such that the enable signal $S_E$ is outputted to the first memory unit 210. Besides, because the third terminal T23 and the fourth terminal T24 are still disconnected at this time, the fourth transistor M4 receives the first reference voltage Vd1 through the resistor R22 causing the fourth transistor M4 to turn on and the third transistor M3 to turn off, thereby preventing the enable signal $S_E$ from being outputted to the second memory unit 220.

Likewise, when the third terminal T23 is coupled to the fourth terminal T24 of the selection unit 260 and the first terminal T21 is disconnected from the second terminal T22, the enable signal $S_E$ is outputted to the second memory unit 220 and prevented from being outputted to the first memory unit 210 as well.

It can be seen from the above circuit operation that the user uses a conductive plate to determine the internal configuration of the selection unit 260 to control the selection unit 260 to output a selection signal to the switch circuit 240 or 250, thereby controlling the enable signal to be provided to the first memory unit 210 or to the second memory unit 220 and hence allowing the user to select the BIOS stored in the first memory unit 210 or the BIOS stored in the second memory unit 220 to boot the computer system. In other words, the present embodiment allows the user to select the BIOS used to boot the computer system prior to the start of the computer.

Besides, the selection unit 260 is implemented as, for example, a 4-terminal jumper in the present embodiment and could also be a button or a slide switch in alternative embodiments.

In addition, the computer system 200 of the present embodiment may further include a microcontroller (not shown). The microcontroller has a transmitting interface for outputting an enable signal, a clock signal, data output and input signals, and the like. The enable signal is outputted to the switch unit 230. The clock signal, data output and input signals are directly outputted to the memory units 210 and 220. Upon the computer system 200 being started, the microcontroller outputs the enable signal to the switch unit 230. It is then determined by the switch unit 230 whether to output the enable signal to the first memory unit 210 or the second memory unit 220 to control the selection of the BIOS used to boot the computer system 200. The microcontroller may, for example, be the south bridge chip or an embedded controller and the transmitting interface may, for example, be SPI based on the current technology.

Third Embodiment

Figure 3:
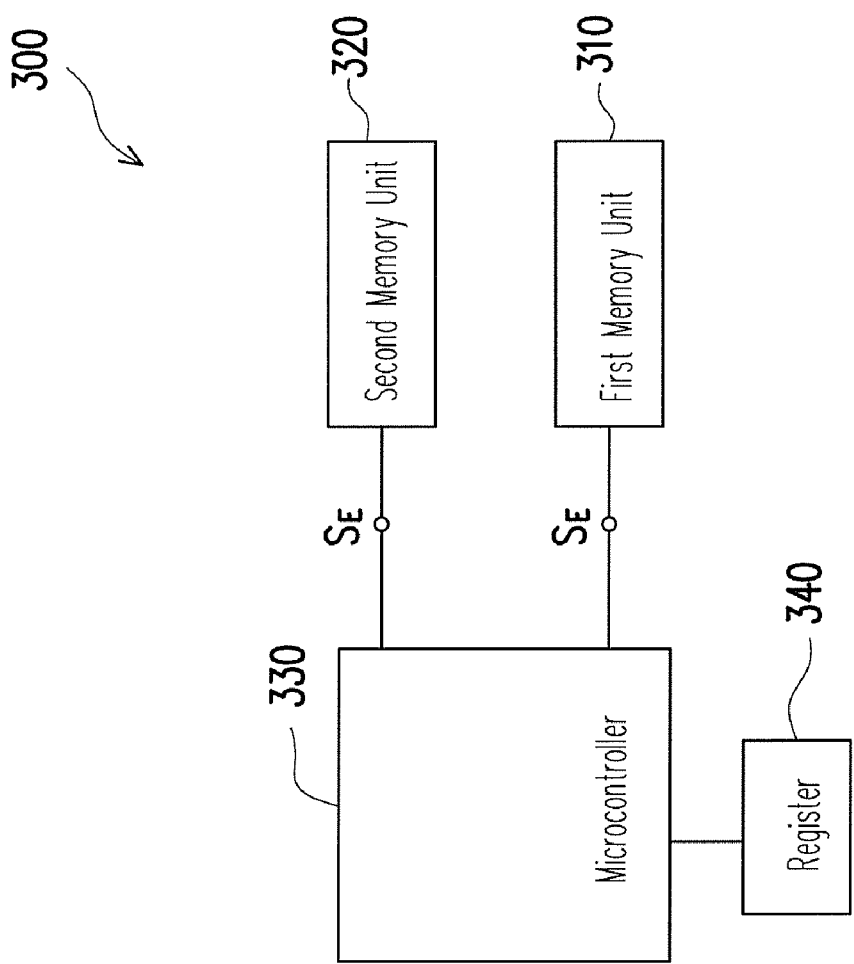
FIG. 3 illustrates a block diagram of a computer system according to a third embodiment of the present invention.

FIG. 3 illustrates a block diagram of a computer system according to a third embodiment of the present invention. Referring to FIG. 3, the computer system 300 includes a first memory unit 310, a second memory unit 320, a microcontroller 330, and a register 340. The first memory unit 310 stores a first BIOS and the second memory unit 320 stores a second BIOS. The register 340 records a setting. The microcontroller 330 controls an output of the enable signal SE to one of the first memory unit 310 and the second memory unit 320 to determine whether to use the first BIOS or the second BIOS to boot the computer system 300 according to the setting in the register.

The setting in the register 340 is set, for example, through a setting interface. For example, the setting in the register 340 is 0 or 1. When the setting is 0, it represents that the first BIOS is used to boot the computer system 300. The microcontroller 330 controls the enable signal $S_E$ to be outputted to the first memory unit 310 upon starting of the computer system 300. On the contrary, when the setting in the register 340 is 1, the microcontroller 330 controls the enable signal $S_E$ to be outputted to the second memory unit 320. The setting interface is, for example, a BIOS setup menu.

Fourth Embodiment

Figure 4:
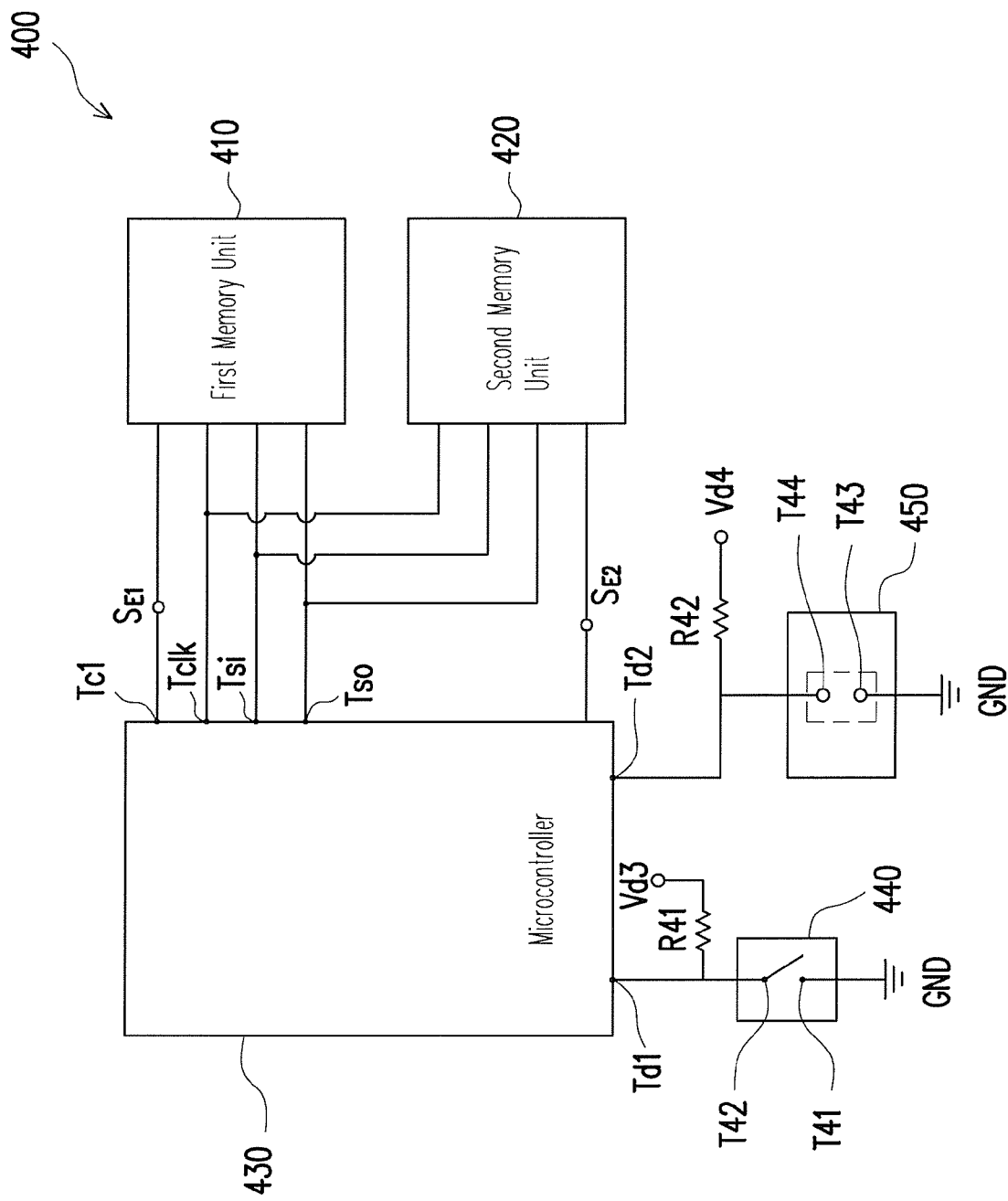
FIG. 4 illustrates a block diagram of a computer system according to a fourth embodiment of the present invention.

FIG. 4 illustrates a block diagram of a computer system according to a fourth embodiment of the present invention. Referring to FIG. 4, the computer system 400 includes a first memory unit 410, a second memory unit 420, a microcontroller 430, and a switch 440. It is assumed that the first memory unit 410 stores a first BIOS. It is also assumed that a standby power has been already supplied to the microcontroller 430, the first memory unit 410 and the second memory unit 420 prior to the starting of the computer system 400.

The microcontroller 430 controls input/output of the first memory unit 410 and the second memory unit 420. In addition, the microcontroller 430 is able to detect whether the switch 440 is closed. Prior to the starting of the computer system 400, the microcontroller 430 uses the standby power to control the first memory unit 410 to backup the first BIOS data in the first memory unit 410 to the second memory unit 420 when the switch 440 is closed.

As shown in FIG. 4, the microcontroller 430 has a first control terminal Tc1, a second control terminal Tc2, a data output terminal Tso, a data input terminal Tsi, and a clock signal terminal Tclk. Each of the data output terminal Tso, data input terminal Tsi and clock signal terminal Tclk of the microcontroller 430 is coupled to both the first memory unit 410 and the second memory unit 420. The first control terminal Tc1 is coupled to the first memory unit 410 and the second control terminal Tc2 is coupled to the second memory unit 420.

When the first control terminal Tc1 of the microcontroller 430 outputs a first enable signal $S_{E1}$ to the first memory unit 410, the first memory unit 410 and the microcontroller 430 transmit data therebetween through the data output terminal Tso, data input terminal Tsi and clock signal terminal Tclk. At this time, the second memory unit 420 ignores the signals transmitted through the data output terminal Tso, data input terminal Tsi and clock signal terminal Tclk. In other words, at this time, the first memory unit 410 can output the internal first BIOS data to the microcontroller 430.

When the second control terminal Tc2 of the microcontroller 430 outputs a second enable signal $S_{E2}$ to the second memory unit 420, the second memory unit 420 and the microcontroller 430 transmit data therebetween through the data output terminal Tso, data input terminal Tsi and clock signal terminal Tclk. At this time, the first memory unit 410 ignores the signals transmitted through the data output terminal Tso, data input terminal Tsi and clock signal terminal Tclk. In other words, at this time, the microcontroller 430 can output the first BIOS data, which was transmitted from the first memory unit 410, to the second memory unit 420, thus storing the first BIOS into the second memory unit 420 to backup the first BIOS. If the second memory unit 420 also stores a second BIOS, the second BIOS can also be backed up to the first memory unit 410 in a similar way as described above.

However, if a user mistakenly triggers the switch 440, the microcontroller 430 then operates to backup the BIOS as described above, which causes the BIOS data to be erroneously written into the memory unit. To avoid this miswriting problem, the microcontroller 430 of the present embodiment further includes a first detection terminal Td1 and a second detection terminal Td2. The two detection terminals Td1 and Td2 provide the microcontroller 430 with a double-check mechanism to determine whether to backup the BIOS.

With continuous reference to FIG. 4, the switch 440 has a first terminal T41 and a second terminal T42. The first terminal T41 is coupled to a ground voltage GND. The second terminal T42 is coupled to the microcontroller 430 and a resistor R41. One end of the resistor R41 is coupled to the second terminal T42 of the switch 440 and the other end of the resistor R41 receives a reference voltage Vd3. When the switch 440 is closed, the first terminal T41 is electrically coupled to the second terminal T42 causing the first detection terminal Td1 of the microcontroller 430 to be at the ground voltage. When the switch 440 is opened, the first terminal T41 is disconnected from the second terminal T42 causing the first detection terminal Td1 of the microcontroller 430 to be approximately at the reference voltage Vd3.

In addition, the computer system 400 of FIG. 4 further includes a switch element 450 having a first terminal T43 and a second terminal T44. The first terminal T43 is coupled to the ground voltage GND. The second terminal T44 is coupled to the second detection terminal Td2 of the microcontroller 430 and a resistor R42. One end of the resistor R42 is coupled to the second terminal T44 of the switch element 450, and the other end of the resistor R42 receives a reference voltage Vd4. When the first terminal T43 is electrically connected to the second terminal T44 of the switch element 450, the second detection terminal Td2 of the microcontroller 430 is caused to be at the ground voltage. When the first terminal T43 is disconnected from the second terminal T44 of the switch element 450, the second detection terminal Td2 of the microcontroller 430 is caused to be approximately at the reference voltage Vd4.

In the present embodiment, the microcontroller 430 can activate the BIOS backup when, for example, the microcontroller 430 detects that the detection terminals Td1 and Td2 are both at the ground voltage at the same time. Alternatively, the BIOS backup is activated when the second detection terminal Td2 is continuously at the ground voltage GND and the first detection terminal Td1 is maintained at the ground voltage GND for a specific time period (e.g., two or three seconds). In the present embodiment, the switch element 450 is implemented as, for example, a 2-terminal jumper and the switch 440 is implemented as, for example, a press button. In other words, the microcontroller 430 activates the BIOS backup only when a conductive plate is used to interconnect the terminals T43 and T44 of the switch element 450 and, at the same time, the button has been pressed to close the switch for more than a specific time.

In the foregoing embodiments, the microcontroller may be a south bridge chip on the motherboard or an embedded controller, and the memory units may be a flash memory or another type of non-volatile memory.

In summary, the present invention has at least the following advantages:
1. The present invention includes a switch unit such that the internal configuration of the switch unit can be changed prior to starting of the computer system. Upon the computer system being started, the computer system determines the BIOS used to boot the computer system according to the internal configuration of the switch unit. Therefore, users can select the BIOS used to boot the computer system prior to the starting of the computer system.
2. The present invention includes a microcontroller that enables the computer to backup the BIOS prior to the starting of the computer.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A computer system comprising:
a first memory unit storing a first basic input/output system;
a second memory unit storing a second basic input/output system, wherein the first memory unit and the second memory unit are two independent storages in the computer system;
a switch unit having a first hardware configuration and a second hardware configuration;
wherein, upon the computer system being started, the switch unit only receives an enable signal output from a microcontroller, such that when the switch unit is in the first hardware configuration, only the enable signal is provided to the first memory unit to start the first basic input/output system, and when the switch unit is in the second hardware configuration, only the enable signal is provided to the second memory unit to start the second basic input/output system;
wherein the switch unit is only used to transmit the enable signal to the first memory unit or the second memory unit in response to the first hardware configuration or the second hardware configuration, so as to start the first basic input/output system or the second basic input/output system, wherein the switch unit comprises:
a first switch circuit having an input terminal receiving the enable signal and an output terminal coupled to the first memory unit, and the first switch circuit comprising:
a first transistor, having a drain to be served as the input terminal of the first switch circuit, and a source to be served as the output terminal of the first switch circuit;
a second transistor, having a drain coupled to a gate of the first transistor, and a source coupled to a ground voltage; and
a first resistor, having a first terminal receiving a first reference voltage and a second terminal coupled to the gate of the first transistor; and
a selection element, having a first terminal coupled to the ground voltage, a second terminal coupled to a second reference voltage through a second resistor and coupled to a gate of the second transistor, a third terminal coupled to the ground voltage, and a fourth terminal coupled to the second reference voltage through a third resistor,
wherein when the switch unit is in the first hardware configuration, the first and the second terminals of the selection element are connected with each other; and when switch unit is in the second hardware configuration, the third and the fourth terminals of the selection element are connected with each other.

2. The computer system according to claim 1, wherein the switch unit further comprises:
a second switch circuit having an input terminal receiving the enable signal and an output terminal coupled to the second memory unit, and the second switch circuit comprising:
a third transistor, having a drain to be served as the input terminal of the second switch circuit, and a source to be served as the output terminal of the second switch circuit;
a fourth transistor, having a drain coupled to a gate of the third transistor, a source coupled to the ground voltage, and a gate coupled to the fourth terminal of the selection element; and
a fourth resistor, having a first terminal receiving the first reference voltage and a second terminal coupled to the gate of the third transistor.

3. The computer system according to claim 1, wherein the selection element is a 4-terminal jumper.

4. The computer system according to claim 1, wherein the microcontroller further comprises a transmitting interface for outputting the enable signal, a clock signal and a data output signal.

5. The computer system according to claim 4, wherein the transmitting interface is a serial peripheral interface.

6. The computer system according to claim 1, wherein the microcontroller is a south bridge chip or an embedded controller.

* * * * *